May 11, 1965 H. G. HAHM ETAL 3,182,754
CALIPER TYPE DISC BRAKE
Filed May 16, 1963 2 Sheets-Sheet 1

INVENTORS:
HEINZ GÜNTHER HAHM &
FRITZ OSTWALD
BY:
Mestern, Ross & Mestern

May 11, 1965  H. G. HAHM ETAL  3,182,754
CALIPER TYPE DISC BRAKE
Filed May 16, 1963  2 Sheets-Sheet 2

INVENTORS:
HEINZ GÜNTHER HAHM &
FRITZ OSTWALD
BY:
Mestern, Ross & Mestern

United States Patent Office 3,182,754
Patented May 11, 1965

3,182,754
CALIPER TYPE DISC BRAKE
Heinz Günther Hahm and Fritz Ostwald, Frankfurt am Main, Germany, assignors to Alfred Teves Maschinen- und Armaturenfabrik K.G., Frankfurt am Main, Germany, a corporation of Germany
Filed May 16, 1963, Ser. No. 280,870
Claims priority, application Germany, May 25, 1962, T 22,199
8 Claims. (Cl. 188—73)

The present invention relates to improvements in hydraulically operated disk brakes and, more particularly, to such brakes having a pair of brake shoes displaceable against opposite surfaces of a brake disk over a limited portion of these surfaces for restricting relative rotation between the disk and a support upon which the brake is mounted.

In general, a disk brake of this type is provided with a hydraulic or pneumatic cylinder, as one member of the actuating means, which is mounted upon a support and cooperates with one brake shoe to force it into engagement with a surface of the disk while a yoke or the like, bridging the disk surfaces and coupled with the other actuating member (e.g. the piston), draws another brake shoe against the opposite disk surface. These brakes have found particularly useful application in the automotive field of late since they wear relatively slowly, can be applied rapidly, require little hydraulic power to effect the braking action, and occupy relatively little space while having the braking characteristics of drum-type brakes. The conventional disk brakes, however, are somewhat inconvenient in that replacement of the brake lining on one or both of the brake shoes frequently requires total disassembly of the brake with removal of the fluid-operated cylinder and piston as well as any restoring means and the housing together with the aforementioned yoke. In an attempt to avoid such complex disassembly for replacement of the brake linings, it has been proposed to hinge the yoke and/or the actuating cylinder upon the support means and thus enable it to be swung rearwardly, thereby permitting removal of the brake shoes for replacement of the lining. Even such constructions were found to be awkward, however, since the particular arrangement of brake elements often required the brake shoes to be mounted on studs or pins which simultaneously served as guides. When such anchoring means were provided, removal of the brake shoe was even more complicated as will be apparent.

It is an object of the present invention to provide an improved disk brake of the general character described above wherein, however, removal of the brake shoes for substitution by others or replacement of their linings is facilitated.

A further object of this invention is to provide a brake arrangement whereby lining replacement and brake shoe removal can be carried out without disassembling of the actuating means, yoke or housing.

Yet another object of our invention is to provide an improved restoring means for incorporation in a disk brake of the aforedescribed type.

Still a further object of the invention is the provision of improved actuating means in a disk-type brake.

These and other objects, which will become apparent hereinafter, are attained, in accordance with the present invention, by providing a disk brake wherein a support means, relatively to which the brake disk is journaled for rotation about an axis, carries the usual fluid-operated actuating means (e.g. a piston and cylinder) which is provided with housing means partially enclosing a brake shoe engageable by the actuating means and, advantageously, forming a yoke bridging the opposite surfaces of the brake disk. An essential feature of the present invention resides in the fact that this housing means or yoke, which forms a compact unit with the cylinder, is provided with an opening through which the brake shoe can be removed in a radial direction with respect to the disk axis. It is apparent, therefore, that displacement of the yoke and/or the actuating means or disassembly of the brake is not required if the brake shoe is to be withdrawn for replacement of its lining.

Advantageously, the support means forms a radially outwardly open guide channel for displacement of the brake shoe perpendicularly to the respective surface of the brake disk, this channel registering with the aforementioned opening in the yoke. The brake shoe preferably has a relatively flat surface abuttingly engaged by a correspondingly flat surface of the actuating means so that stud-and-pin anchors are eliminated. Under these circumstances the shoe can simply be slipped into the guide channel through the yoke opening and urged by the actuating means against the disk when the pressure is applied. To center the brake shoe within the guide channel and/or to limit any radial slippage tending to force it out of this channel, holding means, advantageously in the form of symmetrically effective spring means adapted to center the brake shoe, are provided along the radial outermost portion of the yoke and shoe.

According to another feature of the present invention the yoke, on the side of the brake disk remote from the actuating means, bears upon a further brake shoe which likewise is removable through the aforementioned yoke opening. The support means thus should include a portion embracing the disk in the region of the brake shoes and forming a guide channel outwardly open in a radial direction and, as previously described, aligned with the yoke opening. Both brake shoes preferably comprise a steel plate to which the replaceable brake lining is rigidly secured by the usual bonding techniques.

In contradistinction to earlier devices wherein the actuating cylinder and/or yoke was pivotally mounted to permit removal of the brake shoes, the yoke of the present disk brake may be rigidly connected with one of the actuating members (preferably the fluid-responsive cylinder) and is non-rotatably guided for movement parallel to the axis of the disk. The guide means insuring this linear motion and preventing pivoting of the yoke can include a sleeve member secured to these support means or constituting part thereof within which the cylinder is shiftable. The guide sleeve may be provided with one or more longitudinally extending slots perpendicular to the braking surfaces of the disk while the cylinder or yoke has one or more studs slidably received in these slots for positive guidance in axial direction. At least one of these studs preferably extends generally transversely to the axis of the cylinder and serves as an inlet for the fluid under pressure.

According to still another aspect of our invention, the disk brake includes an improved restoring means for permitting the withdrawal of the brake shoes, to the limited extent necessary, from engagement with the brake disk. It has been proposed heretofore to employ, as restoring means for this purpose, coil and leaf springs as well as relatively complex mechanisms for the automatic adjustment of the brake play. In most cases, however, material fatigue and inconsistency of action rendered these earlier self-adjusting mechanisms and restoring means unsatisfactory over prolonged periods. According to the present invention, the restoring means includes a resilient element carried with play by the support means and frictionally engaging the actuating means. When the brake is actuated, the resilient element is stressed until the resilient force is exceeded by the force tending to displace the element whereupon frictional slippage between the actuating means and the resilient element occurs. This relative displacement ceases, of course, when the brake shoes bear firmly against the disk. Upon relaxation of the braking pressure, however, the resilient element, maintained in its stressed state, frictionally engages the actuating member and draws it slightly in the opposite direction to permit slight shifting of the brake shoes away from the disk. The brake play is thus completely defined by the resiliency of the elastic element and the extent of its frictional engagement with the cylinder member of the actuating means. We prefer to provide the restoring element in the form of a rubber O-ring seated in an internal circumferential groove within the guide sleeve previously mentioned whereby this O-ring is in frictional engagement with the pressure cylinder. The latter can be formed with a shoulder abuttingly engageable with the sleeve for delimiting the maximum displacement of the actuating means.

The above and other objects, features and advantages of the present invention will become more readily apparent from the following description, reference being made to the accompanying drawing in which.

Figure 1:
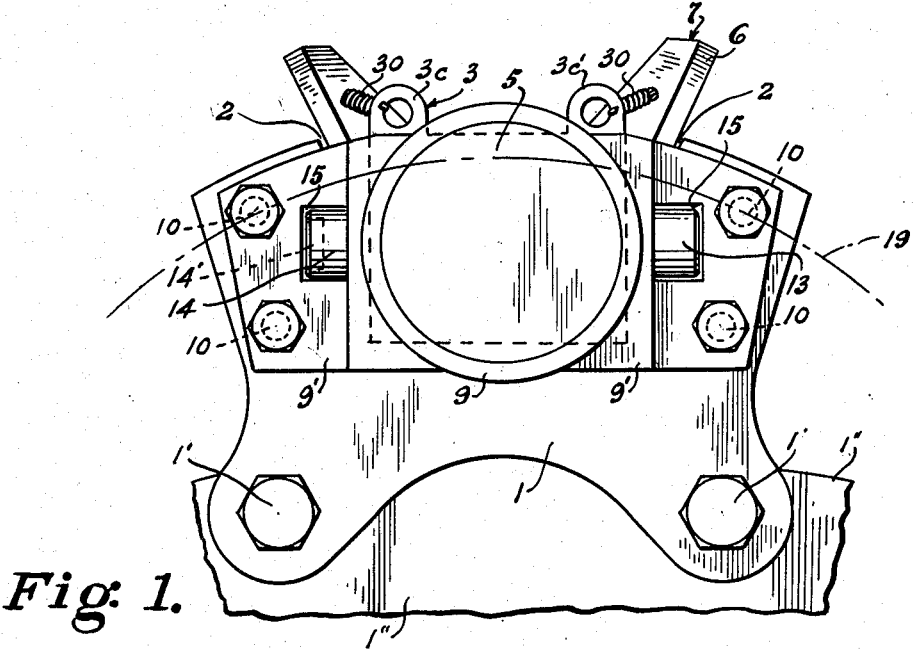
FIG. 1 is a front-elevational view of a disk brake according to the invention.
Figure 2:
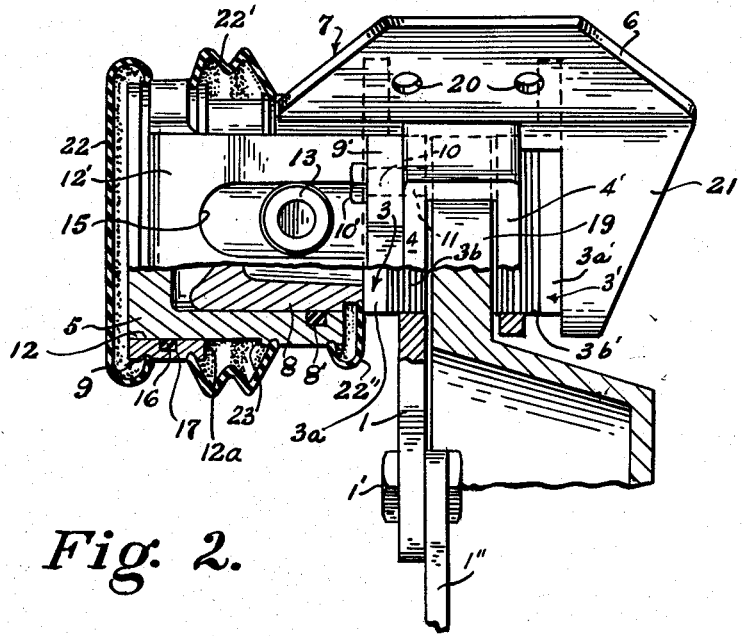
FIG. 2 is a side-elevational view thereof partly in axial section.

In the drawing we show a disk brake whose support means 1 is secured by bolts 1' to a portion of the vehicle chassis 1" and with respect to which the brake disk 19 is journaled for rotation about an axis. This brake disk may be coupled to the axle of the wheel of the vehicle or to the driving shaft thereof. The support 1 is formed with a guide channel 4 outwardly open in radial direction on one side of the brake disk 19 and is bent over the edge of the latter to embrace it and form a second guide channel 4' on the opposite side of this disk. A pair of brake shoes 3, 3' are guided in these channels 4, 4', respectively, for displacement perpendicular to the brake disk 19. The support 1 thus is provided with a gap 2 adapted to receive the disk 19 and within which the shoes 3, 3' are movable. As is best seen in FIG. 2, the actuating means for the brake comprises a fluid-pressure cylinder 5 with which the yoke 6 is integral and forms a housing means 7. Piston 8 is received within the cylinder 5 while an annular seal 8' prevents the escape of fluid from the cylinder around the piston.

Figure 4:
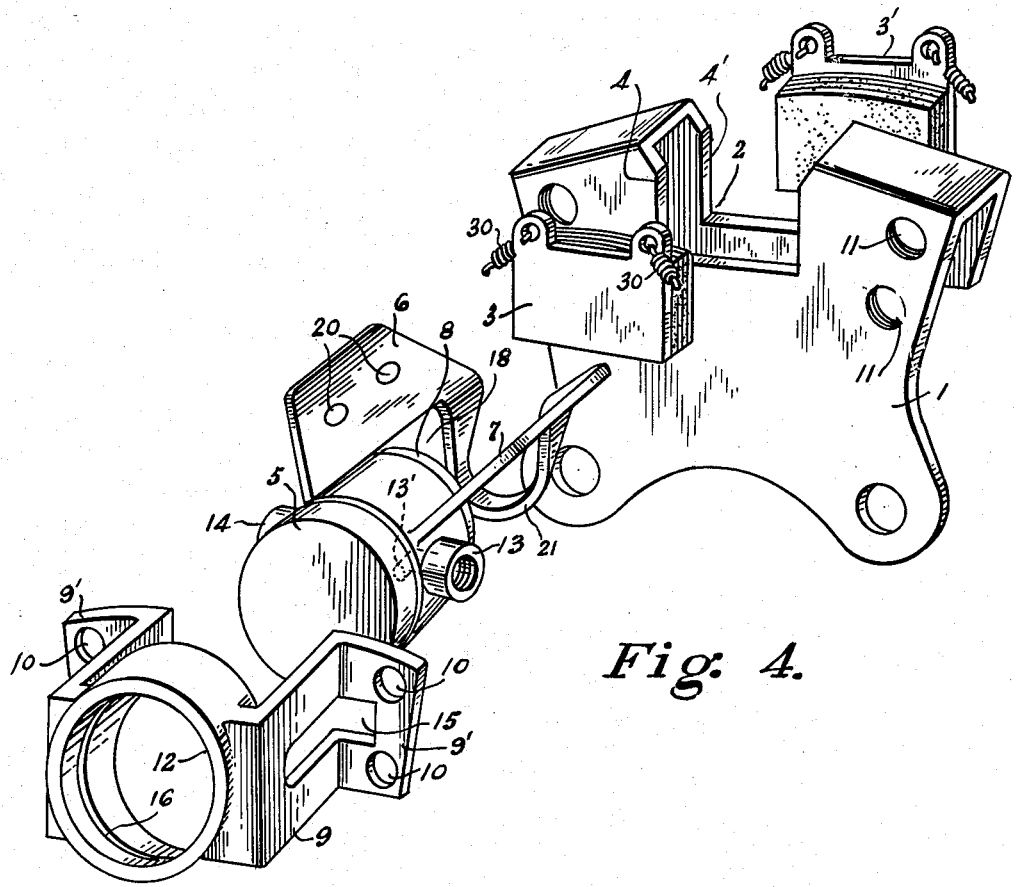
FIG. 4 is a perspective exploded view thereof.
Figure 3:
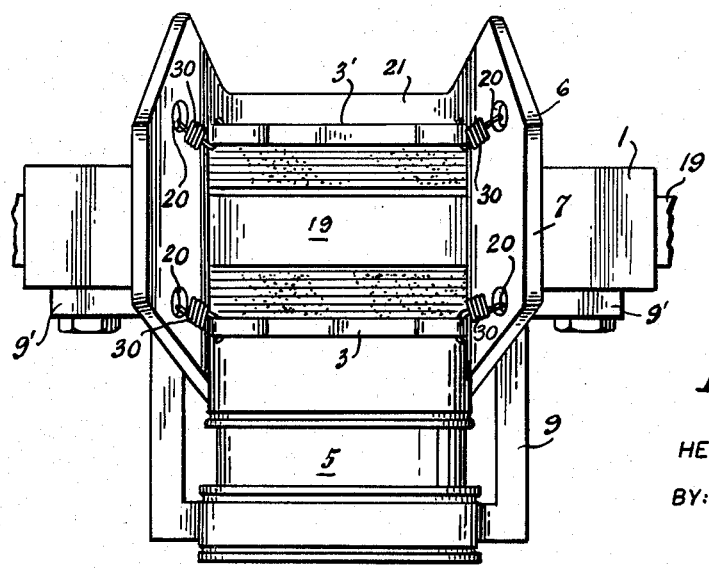
FIG. 3 is a top plan view of the brake.

Cylinder 5 is displaceable in a guide sleeve 12 of the support member 9 whose lateral flanges 9' are provided with bores 10 alignable with the threaded apertures 11 of the support 1. Bolts 10', passing through bores 10, thus rigidly connect the guide means 9 with the support 1. The guide sleeve also includes a pair of diametrically opposite longitudinally extending portions 12' formed with respective longitudinal slots 15 in which studs 13 and 14, integral with and projecting transversely from cylinder 5, are slidably received. These studs 13 and 14 are tubular and communicate with the rearward end of the cylinder 5 via passages 13' (one shown) and can serve as inlets for the pressure fluid. In the present structure, however, inlet 14 is closed by a plug 14' while inlet 13 is threaded to receive the necessary inlet fitting. An annular recess 17 is provided in the inner wall of sleeve 12 and receives an O-ring 16 frictionally engaging the outer surface of cylinder 5 which is formed with an annular shoulder 23 adapted to abut against the face 12a of sleeve 12 and serve as a limit stop for the actuating means. Each of the brake shoes 3, 3' comprises a plate 3a, 3a' to which the respective brake shoe 3b, 3b' is bonded in the usual manner. Each of these shoes is also provided with a pair of lugs 3c, 3c' symmetrically disposed with respect to an axial plane of the disk passing through the axis of cylinder 5 whose apertures are designed to receive centering springs 30 (FIG. 3), constituting holding means which engage bores 20 symmetrically formed in the yoke 6. The latter has a flange 21 extending on the side of disk 19 remote from the actuating means 5, 8 and adapted to urge shoe 3' against the disk. As can be seen in FIGS. 3 and 4, this yoke 6 is provided with an opening 18 aligned with the guide channels 4, 4' through which the brake shoes 3, 3' can be slipped upon disengagement of the springs 30 or any desirable holding device positioned along this region of the yoke. Rubber sleeves 22, 22' and 22" serve to seal the brake against entry of dust and foreign matter. It should be noted that O-ring 16 also has a similar function.

When fluid pressure is supplied to the cylinder 5, piston 8 is displaced to the right (FIG. 2) to urge brake shoe 3 into engagement with the disk 19 while cylinder 5 reacts in the opposite direction to bring flange 21 of yoke 6 to bear against shoe 3'. The cylinder 5 thus moves within the sleeve 12, thereby resiliently stressing the O-ring 16, upon displacement of the latter by the extent of its play, and eventually slipping past the resilient element until both shoes are firmly seated against the disk. When brake pressure releases, the resilient force of the O-ring 16, frictionally applied to cylinder 5, tends to displace it slightly in the opposite direction to maintain brake play which need only be a fraction of a millimeter. No further slippage of the cylinder 5 past the O-ring 16 will take place until the brake shoes 3b, 3b' have become worn to increase the brake play.

Our invention as described and illustrated admits of many modifications within the ability of persons skilled in the art without departing from the spirit and scope of the appended claims.

We claim:

1. A disk brake comprising a brake disk journaled on an axis for rotation relative thereto, support means stationary with respect to said axis; actuating means movably mounted on said support means; said support means being provided with respective radially outwardly open guide channels and said actuating means being provided with an opening radially aligned with said channels; at least two brake shoes operatively engaged by said actuating means and displaceable thereby relatively to said support means into and out of engagement with opposite surfaces of said disk in a direction transverse thereto, said aligned opening of said support means and said actuating means permitting generally radial removal of said brake shoes therefrom, and guide means rigid with said support means for linearly directing said actuating means while preventing rotation thereof, said actuating means including a yoke engageable with one of said brake shoes for driving it against said disk and a fluid-operated cylinder rigid with said yoke, said guide means comprising a sleeve surrounding said cylinder and having an axis parallel to that of said disk, said sleeve being formed with at least one longitudinally extending slot perpendicular to said disk, said cylinder having at least one transversely projecting stud rigid therewith slidably received in said slot.

2. A disk brake as defined in claim 1 wherein said stud is tubular and communicates with the interior of said cylinder, thereby providing a fluid inlet therefor.

3. A disk brake as defined in claim 2 wherein said sleeve is provided with an internal circumferential groove open in the direction of said cylinder, further comprising an O-ring of resiliently compressible material received in said groove and frictionally engaging said cylinder for compression thereby in a direction transversely to the plane of said O-ring upon the actuation of said cylinder with fluid under pressure for restoring said cylinder to an inoperative condition upon deenergization thereof.

4. A disk brake as defined in claim 3 wherein said O-ring has axial play within said groove.

5. A disk brake as defined in claim 1 wherein each of said brake shoes has a relatively flat contact surface, said actuating means including a piston having a relatively flat abutment surface engageable with the flat surface of a respective one of said shoes, said yoke having an abutment surface engageable with the flat surface of the other shoe, said brake further comprising spring means interconnecting said yoke and said shoes for releasably holding said shoes within the respective channels against radial displacement.

6. A disk brake as defined in claim 1 wherein said yoke is formed with an opening adapted to permit radial removal of said brake shoes with respect to the axis of said disk.

7. A disk brake as defined in claim 6 wherein said cylinder is formed with an annular shoulder engageable with said sleeve providing a positive limit stop for the displacement of said cylinder in said sleeve.

8. A disk brake comprising a brake disk journaled on an axis for rotation relative thereto; support means stationary with respect to said axis; guide means including a sleeve having an axis parallel to that of said disk rigid with said support means; a fluid-pressure-responsive cylinder member movably received within said sleeve for displacement toward and away from said disk in a direction perpendicular thereto; a piston displaceably received in said cylinder member; a yoke rigid with said cylinder member and bridging opposite sides of said disk; said support means being provided with respective radially outwardly open guide channels and said yoke being provided with a corresponding opening radially aligned with said channels; first and second brake shoes received in said guide channels and respectively engageable by said piston and said yoke for displacement into frictional engagement with opposite surfaces of said disk upon charging of said cylinder member with fluid under pressure and displacement of both said cylinder members and said piston relatively to said sleeve, said sleeve being formed with an inner circumferential groove open in the direction of said cylinder member and with at least one longitudinally extending slot perpendicular to said disk, said cylinder member having at least one transversely projecting stud slidably received in said slot for limiting the linear movement of said cylinder member and for preventing rotational movement of the latter; restoring means including a resiliently compressible O-ring disposed in said groove for frictionally engaging said cylinder member in the charged condition thereof and for compression thereby in a direction transversely of the plane of said O-ring for restoring said cylinder to a rest position upon de-energization thereof.

References Cited by the Examiner

UNITED STATES PATENTS

| 2,358,740 | 9/44 | Scott-Iversen | 188—72 |
| 2,827,132 | 3/58 | Buyze | 188—73 |
| 2,938,609 | 5/60 | Burnett | 188—73 |
| 2,966,964 | 1/61 | Brueder | 188—73 |
| 3,081,843 | 3/63 | Dotto et al. | 188—73 |
| 3,089,565 | 5/63 | Butler | 188—73 |

FOREIGN PATENTS 844,003   8/60   Great Britain.

ARTHUR L. LA POINT, *Primary Examiner.*

EUGENE G. BOTZ, *Examiner.*